United States Patent
Zhou et al.

(10) Patent No.: US 12,273,054 B1
(45) Date of Patent: Apr. 8, 2025

(54) ELECTRIC VALVE/DOOR, AND CONTROL APPARATUS AND METHOD THEREOF

(71) Applicant: BEIJING RAYMOND-CBE NUCLEAR EQUIPMENT TECHNOLOGY INSTITUTE CO, LTD., Beijing (CN)

(72) Inventors: Wen Zhou, Beijing (CN); Zhanguo Zhao, Beijing (CN); Dapeng Zhang, Beijing (CN); Gang Zhao, Beijing (CN); Tao Zhu, Beijing (CN); Zeping Wang, Beijing (CN)

(73) Assignee: BEIJING RAYMOND-CBE NUCLEAR EQUIPMENT TECHNOLOGY INSTITUTE CO, LTD., Beijing (CN)

( * ) Notice: Subject to any disclaimer, the term of this patent is extended or adjusted under 35 U.S.C. 154(b) by 0 days.

(21) Appl. No.: 18/844,071

(22) PCT Filed: Mar. 16, 2023

(86) PCT No.: PCT/CN2023/081810
§ 371 (c)(1),
(2) Date: Sep. 5, 2024

(87) PCT Pub. No.: WO2023/174361
PCT Pub. Date: Sep. 21, 2023

(30) Foreign Application Priority Data

Mar. 17, 2022 (CN) .......................... 202210261771.0

(51) Int. Cl.
*H02P 21/20* (2016.01)
*F16K 31/04* (2006.01)
*H02P 21/18* (2016.01)

(52) U.S. Cl.
CPC ............ *H02P 21/20* (2016.02); *F16K 31/046* (2013.01); *H02P 21/18* (2016.02); *H02P 2207/01* (2013.01)

(58) Field of Classification Search
CPC ...... H02P 21/20; H02P 21/18; H02P 2207/01; F16K 31/046
(Continued)

(56) References Cited

U.S. PATENT DOCUMENTS 7,193,387 B1 * 3/2007 Lu .................... H02P 21/0021
388/906
2018/0328097 A1 11/2018 Holt et al.

FOREIGN PATENT DOCUMENTS

CN 102003563 A 4/2011
CN 201876333 U 6/2011
(Continued)

*Primary Examiner* — David Luo
(74) *Attorney, Agent, or Firm* — Bayramoglu Law Offices LLC

(57) ABSTRACT

An electric valve/door, and a control apparatus and method thereof are provided. The electric valve/door includes a control apparatus. The control apparatus includes an alternating current (AC) asynchronous motor, a transmission device, and a valve driver. The valve driver is connected to the AC asynchronous motor. The AC asynchronous motor is connected to the valve/door through the transmission device. The valve driver is configured to collect information of a real-time torque of the AC asynchronous motor or the valve/door during operation, and take a set torque of the valve driver as an input and the real-time torque as a feedback to immediately correct an output torque of the valve driver or a limit value of the output torque by using a proportional-integral-derivative (PID) control algorithm, to meet requirements for response speed and control precision of each stage in opening and closing processes of the valve/door.

20 Claims, 8 Drawing Sheets

(58) Field of Classification Search
USPC .......................................... 318/798, 767, 727
See application file for complete search history.

(56) References Cited

FOREIGN PATENT DOCUMENTS

| | | |
|---|---|---|
| CN | 104455641 A | 3/2015 |
| CN | 109782173 A | 5/2019 |
| CN | 111963747 A | 11/2020 |
| CN | 112113019 A | 12/2020 |
| JP | 2009081935 A | 4/2009 |

* cited by examiner

ELECTRIC VALVE/DOOR, AND CONTROL APPARATUS AND METHOD THEREOF

CROSS-REFERENCE TO THE RELATED APPLICATIONS

This application is the national phase entry of International Application No. PCT/CN2023/081810, filed on Mar. 16, 2023, which is based upon and claims priority to Chinese Patent Application No. 202210261771.0, filed on Mar. 17, 2022, the entire contents of which are incorporated herein by reference.

TECHNICAL FIELD

The present disclosure relates to valve/door control technologies, particularly to an electric valve/door, and a control apparatus and method thereof.

BACKGROUND

Most of electric valve/door apparatuses in the prior art use a power supply to directly start an alternating current (AC) asynchronous motor. By being controlled by a driver, the motor drives a mechanical transmission mechanism to drive a valve/door to run, thereby opening/closing the valve. The AC asynchronous motor has been widely used in electric valve/door apparatuses due to its advantages of a simple structure, reliable running, light weight, low cost, and a large break-out torque. However, there are following problems during use:

1) The AC asynchronous motor has a low torque control precision and small dynamic torque and rotational speed ranges (peak torque and speed are limited). In addition, due to factors such as a medium temperature, a foreign object, and rusting, a driving torque of the AC asynchronous motor cannot overcome drag torque, and as a result, in a process of opening the valve, the valve/door cannot be opened. During running of the valve/door, a rotational speed of the AC asynchronous motor is fixed, and a speed of opening/closing the valve remains unchanged. In a process of closing the valve, when the valve reaches a stop point, a dynamic load of a valve seat is overloaded. As a result, the valve/door cannot be opened after being tightly closed.

2) The opening/closing of the valve is stopped through point triggering. Specifically, a travel switch (or reed switch) is disposed at a valve opening/closing stop point of a valve body, and the valve/door is stopped based on a signal indicating that the travel switch (or reed switch) is in place. Due to an inherent mechanical clearance between contact points of the travel switch (or reed switch) and a large precision error in repeated control, the opening/closing of the valve is stopped when the valve/door is not closed tightly or cannot be stopped after the valve/door is closed tightly. As a result, improper sealing occurs on the valve/door, or the AC asynchronous motor cannot be stopped and burn out. Moreover, the stop method based on the point triggering cannot achieve high-precision position control throughout an entire stroke, and an operator cannot obtain real-time position information of the valve/door.

3) The magnitude of force on the valve seat when the valve is closed in place is not controlled, which easily causes the valve/door to not be closed tightly, resulting in the improper sealing of the valve/door. Characteristic changes caused by wear, aging, and electrical parameter drift during long-term use of the valve/door result in a large error between theoretical and actual output values, and the magnitude of the force on the valve seat when the valve is closed in place is unstable.

4) Differences in the physical characteristics of AC asynchronous motors are not considered, resulting in poor precision in torque, speed, and position control, small dynamic torque and rotational speed ranges, and inconsistent performance of batch products.

SUMMARY

In order to overcome the above defects in the prior art, the present disclosure provides an electric valve/door, and a control apparatus and method thereof.

In order to achieve the above objective, the present disclosure provides a control apparatus of an electric valve/door, including an alternating current (AC) asynchronous motor, a transmission device, and a valve driver, where the valve driver is connected to the AC asynchronous motor; the AC asynchronous motor is connected to a valve/door through the transmission device; the valve driver is configured to collect information of a real-time torque of the AC asynchronous motor or the valve/door during operation, and take a set torque of the valve driver as an input and the real-time torque as a feedback to immediately correct an output torque of the valve driver or a limit value of the output torque by using a proportional-integral-derivative (PID) control algorithm, so as to adjust in real time an output torque that drives the AC asynchronous motor, to meet requirements for a response speed and control precision of each stage in opening and closing processes of the valve/door.

In the above control apparatus of an electric valve/door, the valve driver includes a casing, and a logic control module, a frequency conversion control module, and a frequency conversion driver module that are installed inside the casing, where the frequency conversion driver module is connected to the AC asynchronous motor, the logic control module is connected to the frequency conversion driver module through the frequency conversion control module, the logic control module is configured to adjust an output torque of the frequency conversion driver module or a limit value of the output torque in real time through the frequency conversion control module, and the logic control module includes:

a torque setting unit configured to set the corresponding set torque according to a requirement of each stage in the opening and closing processes of the valve/door;

a torque output unit configured to send the set torque to the frequency conversion driver module, such that the frequency conversion driver module takes the set torque as the output torque or the limit value of the output torque to drive the AC asynchronous motor to perform a corresponding opening or closing action of the valve/door;

a real-time torque detection unit configured to obtain the real-time torque of the AC asynchronous motor or the valve/door during operation; and a torque correction unit configured to correct the output torque or the limit value of the output torque by using the PID control algorithm based on the real-time torque and the set torque, and transmit a corrected output torque or a corrected limit value of the output torque to the torque output unit, such that the torque output unit transmits the corrected output torque to the frequency conversion driver module through the frequency conversion control module, and the frequency conversion driver module drives the AC asynchronous motor to respond in real time.

In the above control apparatus of an electric valve/door, the logic control module further includes an output current detection unit connected to the real-time torque detection unit, and the output current detection unit is configured to detect a physical parameter of the AC asynchronous motor and transmit the physical parameter to the real-time torque detection unit, such that the real-time torque detection unit calculates the real-time torque and transmits the real-time torque to the torque correction unit, where the physical parameter includes resistance of a stator, resistance of a rotor, mutual inductance between the stator and the rotor, leakage inductances of the stator and the rotor, and/or a no-load current.

The above control apparatus of an electric valve/door further includes a torque sensor configured to obtain the real-time torque, where the torque sensor is installed on an output shaft of the AC asynchronous motor, an output shaft of a reduction transmission case of the valve, or a valve driving mechanism, and is connected to the real-time torque detection unit or the frequency conversion control module to transmit a measured real-time torque signal to the real-time torque detection unit or the frequency conversion control module.

The above control apparatus of an electric valve/door further includes a position sensor, where the logic control module further includes a speed control unit connected to the position sensor and configured to collect a feedback signal from the position sensor to obtain a current speed of the valve, correct an output speed of the AC asynchronous motor by using the PID control algorithm, and superimpose and correct the output torque with the torque correction unit to meet a speed requirement of each stage in opening or closing of the valve/door.

In the above control apparatus of an electric valve/door, the logic control module further includes a position control unit connected to the position sensor and configured to determine, based on the feedback signal from the position sensor, whether a position node of each stage in the opening or closing process of the valve/door is reached, and further adjust the output torque based on a determining result to meet requirements for control logic and stop position precision of each stage in the opening or closing of the valve/door.

In the above control apparatus of an electric valve/door, the position sensor is a full-stroke sensor and/or a point-type sensor, and the position sensor is installed on the output shaft of the AC asynchronous motor, an output shaft of a reduction transmission case of the transmission device, or the valve driving mechanism.

The above control apparatus of an electric valve/door further includes a torque calibration device detachably connected to the AC asynchronous motor and connected to the logic control module, and configured to perform torque calibration on the AC asynchronous motor to correct the output torque of the valve driver.

In order to better achieve the above objective, the present disclosure further provides a control method of an electric valve/door, including: using the above control apparatus of an electric valve/door to collect information of a real-time torque of an AC asynchronous motor or a valve/door during operation, and take a set torque of a valve driver as an input and the real-time torque as a feedback to immediately correct an output torque of the valve driver by using a PID control algorithm, so as to adjust in real time an output torque that drives the AC asynchronous motor, to meet a requirement for a control strategy in opening and closing processes of the valve/door.

In order to better achieve the above objective, the present disclosure provides an electric valve/door, including the above control apparatus of an electric valve/door.

The technical effects of the present disclosure are as follows:

The present disclosure takes a set torque as an input and a real-time torque of a detected AC asynchronous motor or valve/door during operation as a feedback. An output torque in a driving process is corrected by using a PID control algorithm, and the output torque is adjusted immediately based on the real-time torque. This achieves closed-loop torque control in opening and closing of an electric valve/door, and effectively improves a response speed and control precision of the output torque. In addition, the present disclosure can also use a multi-PID nesting method to establish torque loop (also known as current loop), speed loop, and position loop from the inside out, and select a closed-loop level or a nesting depth based on needs of different stages in an execution process of the valve/door. In this way, precise torque, speed, and position control can be achieved for an ordinary AC asynchronous motor by optimizing a matching parameter of a speed and a torque based on changes of a full-stroke load in the opening and closing of the valve/door, thereby ensuring that the valve/door can be "closed tightly", "stopped accurately", and "opened". In addition, based on a start-up stage, an acceleration stage, a constant speed stage, a deceleration stage, a slow-speed approaching stage, a torque control stage, and a stop stage during movement of the valve/door, staged combination control can be achieved, thereby meeting requirements for fast opening and closing of the valve/door, water hammer arresting, working condition control of the valve, and fault response. By means of short-term "overfrequency" (overspeed) operation and "overcurrent" (overtorque) operation, a smaller-rated AC asynchronous motor can be used compared to a valve driver in the prior art, thereby reducing a product volume and weight, lowering a cost, and improving a dynamic characteristic of a pipeline system. In this way, load smoothness control of the ordinary AC asynchronous motor is improved, and impact on a power grid can be also reduced.

The present disclosure is further described in detail below with reference to the accompanying drawings and specific embodiments, but this is not intended to limit the present disclosure.

Figure 1:
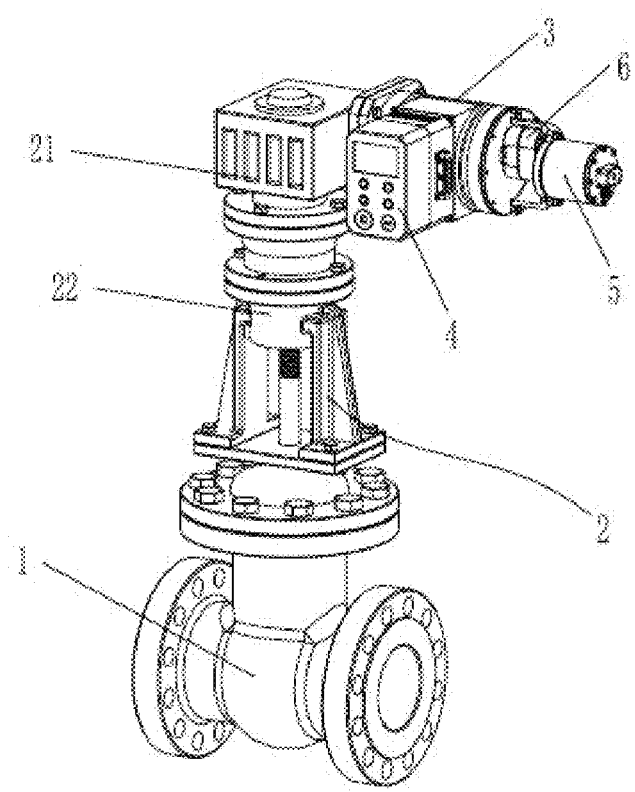
FIG. 1 is a schematic structural diagram of an electric valve/door according to an embodiment of the present disclosure.

REFERENCE NUMERALS IN THE ACCOMPANYING DRAWINGS ARE AS FOLLOWS 1 valve/door
2 transmission device
  21 reduction transmission case
  22 valve driving mechanism
3 AC asynchronous motor
4 valve driver
  41 logic control module
  42 frequency conversion control module
  43 frequency conversion driver module
  44 core controller
  45 signal conversion module/input/output (IO) module
  46 detection and protection module
  47 temperature control module
  48 man-machine interaction module
5 torque calibration device
6 position sensor
7 torque sensor
8 power supply

DETAILED DESCRIPTION OF THE EMBODIMENTS

A structure principle and a working principle of the present disclosure are described in detail below with reference to the accompanying drawings.

Figure 2:
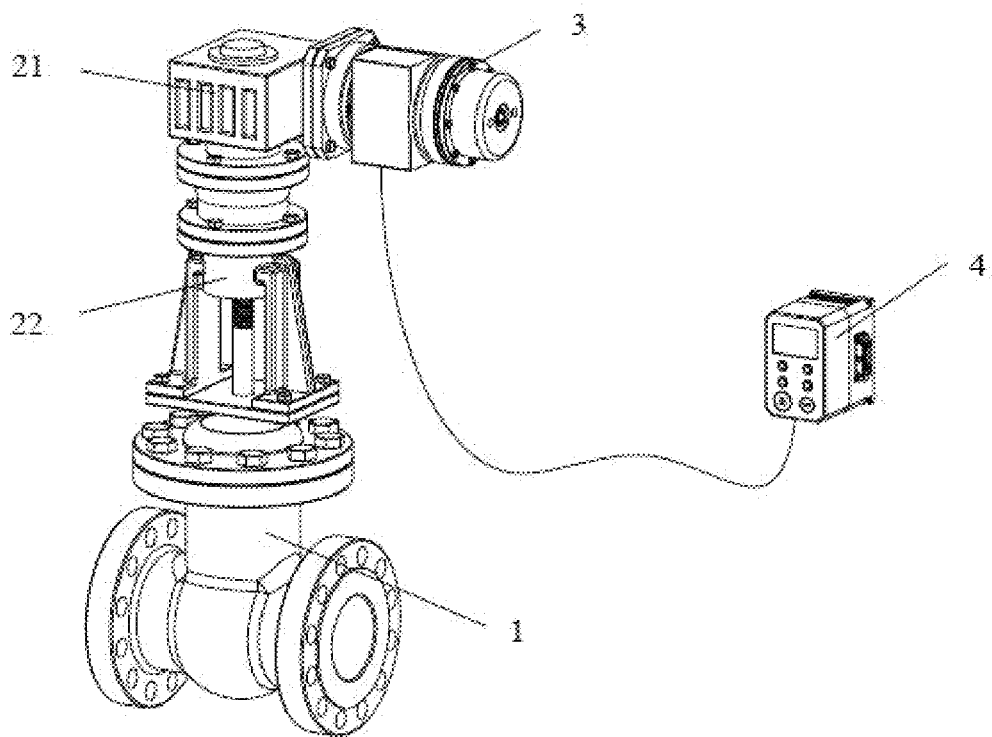
FIG. 2 is a schematic structural diagram of an electric valve/door according to another embodiment of the present disclosure.
Figure 3:
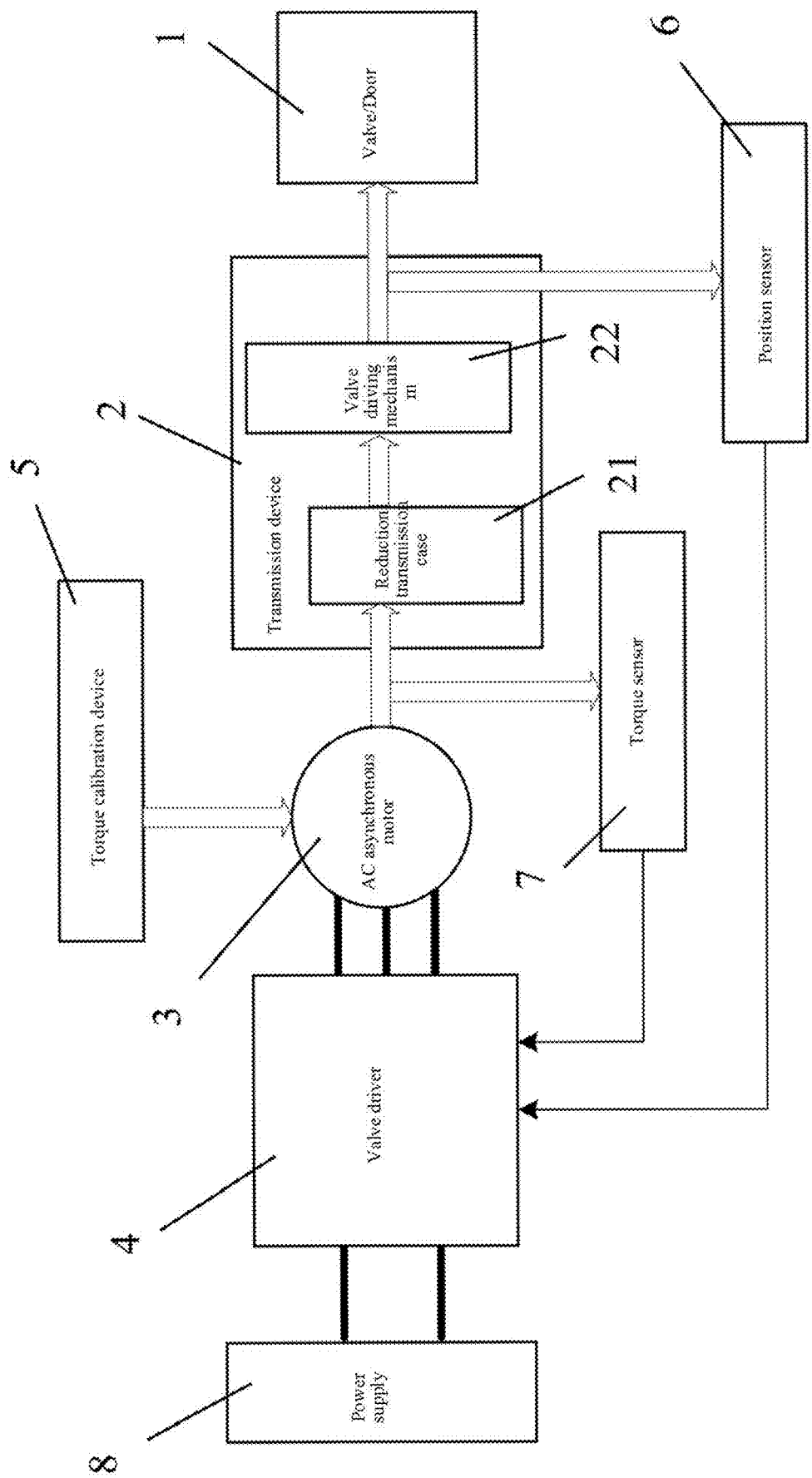
FIG. 3 is a structural block diagram of an electric valve/door according to an embodiment of the present disclosure.

Referring to FIG. 1 to FIG. 3, FIG. 1 is a schematic structural diagram of an electric valve/door according to an embodiment of the present disclosure, FIG. 2 is a schematic structural diagram of an electric valve/door according to another embodiment of the present disclosure, and FIG. 3 is a structural block diagram of an electric valve/door according to an embodiment of the present disclosure. In order to solve problems that a valve/door "cannot be opened", "cannot be closed tightly", and "cannot be stopped accurately" in the prior art, the present disclosure matches different control strategies based on different required working conditions of the valve/door in an application site, such as prioritizing to efficiency (time) of opening/closing the valve, prioritizing to position precision of opening/closing the valve, prioritizing to torque precision of opening/closing the valve, prioritizing to valve safety of opening/closing the valve, prioritizing to pipeline safety of opening/closing the valve, and prioritizing to smoothness of a pipeline system of opening/closing the valve, and provides an electric valve/door and its control apparatus and method, which meet the above execution strategies. The electric valve or the electric door in the present disclosure includes valve/door 1 and a control apparatus. The control apparatus includes transmission device 2, AC asynchronous motor 3, and valve driver 4. The AC asynchronous motor 3 is connected to the valve/door 1 through the transmission device 2. The valve driver 4 is separately connected to power supply 8 and the AC asynchronous motor 3, and is configured to control opening and closing of the valve/door 1 through the AC asynchronous motor 3. The transmission device 2 may include reduction transmission case 21 and valve driving mechanism 22. The reduction transmission case 21 is separately connected to an output shaft of the AC asynchronous motor 3 and an input terminal of the valve driving mechanism 22. An output terminal of the valve driving mechanism 22 is connected to the valve/door 1 to drive the valve/door 1. The valve driver 4 and the AC asynchronous motor 3 may be integrated as a connecting piece (see FIG. 1). Alternatively, the valve driver 4 and the AC asynchronous motor 3 may be separately disposed and connected through a cable or in a wireless manner (see FIG. 2) to separate mechanical driving and electrical driving, thereby meeting requirements of a harsh application environment, such as small installation space, a high temperature, radiation, high humidity, and strong magnetic interference. Compositions, structures, a mutual position relationship, a connection relationship, and working principles of other components of the electric valve/door in the present disclosure are all relatively mature existing technologies, and therefore, are not elaborated herein again. The following only describes the control apparatus in the present disclosure and its working principle in detail.

In the control apparatus of the present disclosure, the valve driver 4 is used to collect information of a real-time torque of the AC asynchronous motor 3 or the valve/door 1 during operation, and take a set torque of the valve driver 4 as an input and the real-time torque as a feedback to immediately correct an output torque of the valve driver 4 or a limit value of the output torque by using a PID control algorithm, so as to adjust in real time an output torque that drives the AC asynchronous motor 3, to meet requirements for a response speed and control precision of each stage in opening and closing processes of the valve/door 1.

Figure 4:
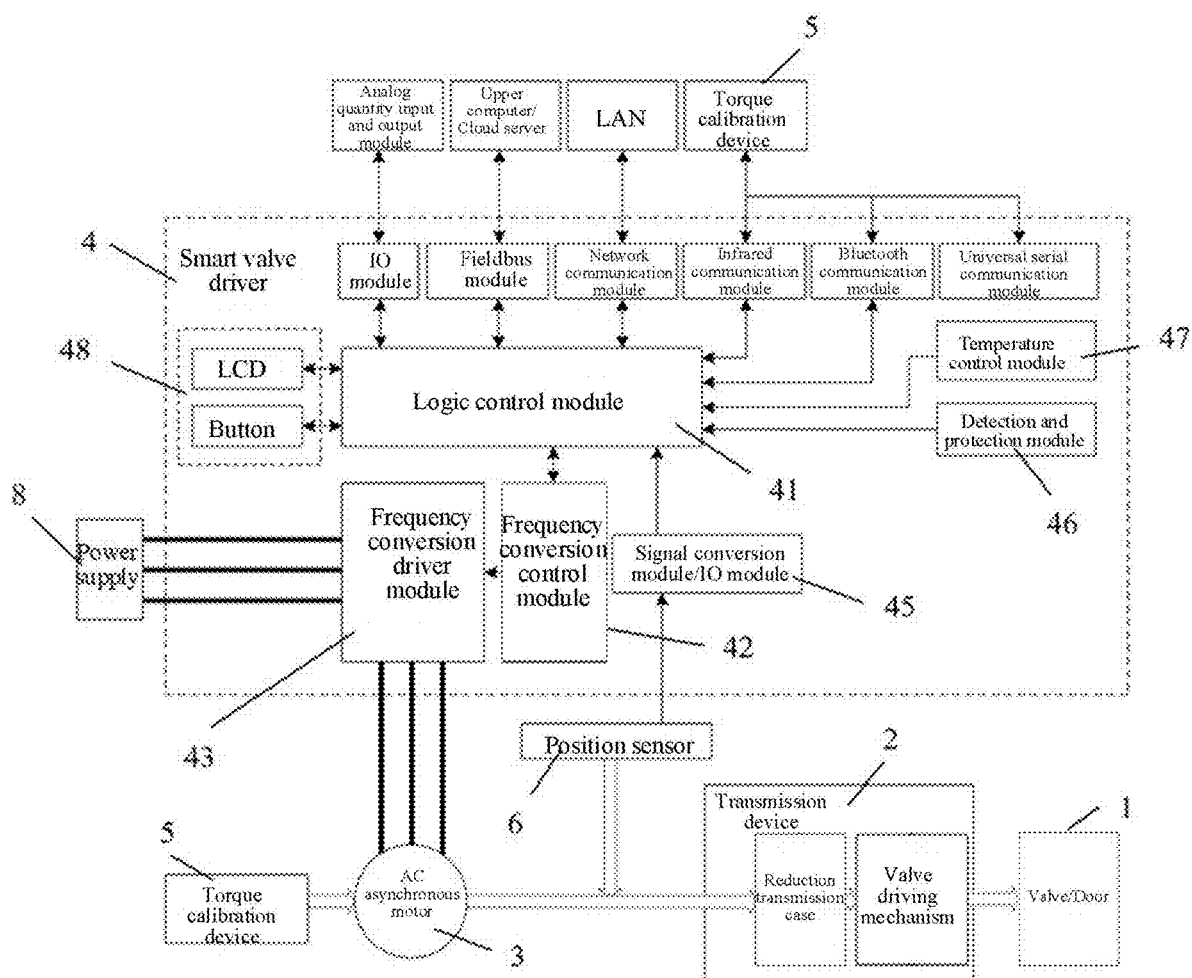
FIG. 4 is a structural block diagram of a valve driver according to an embodiment of the present disclosure.
Figure 5:
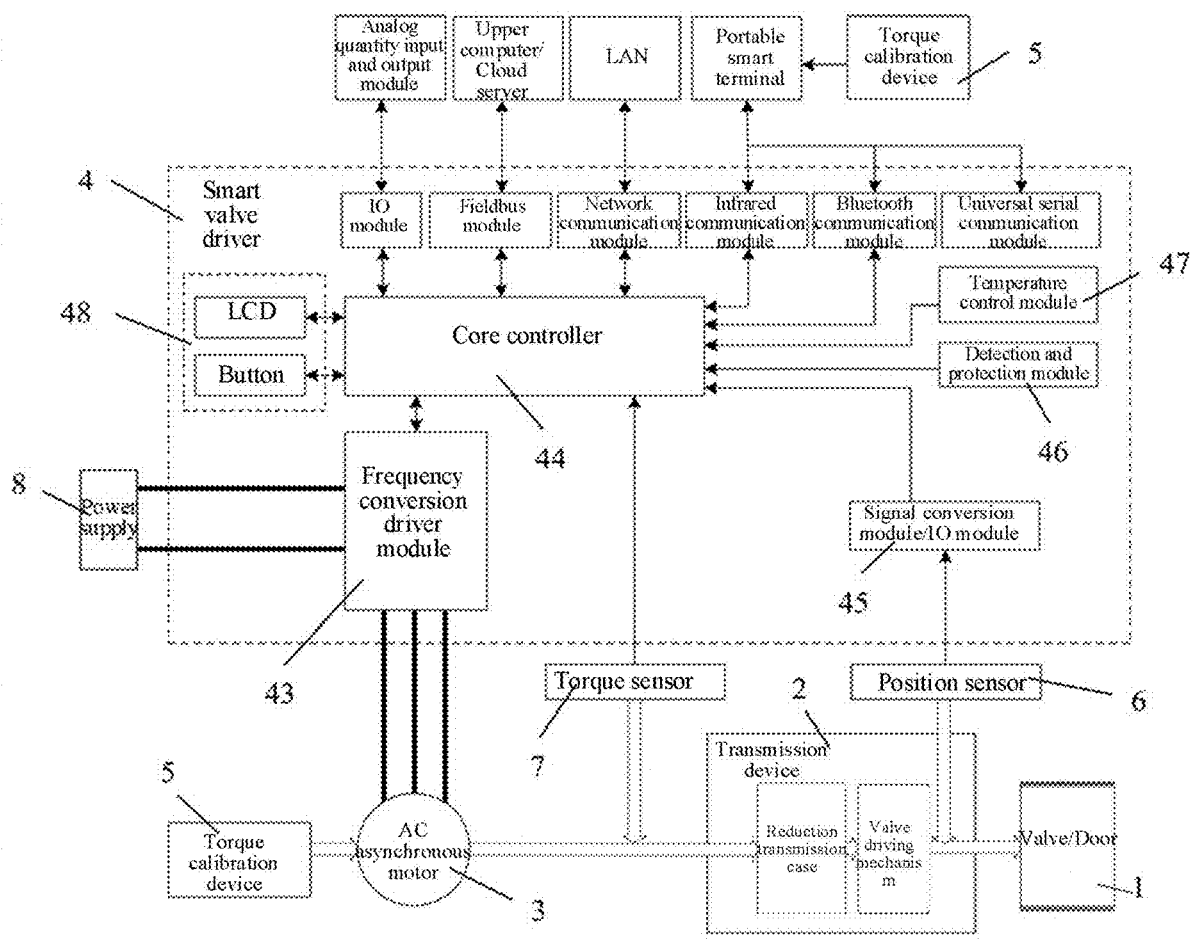
FIG. 5 is a structural block diagram of a valve driver according to another embodiment of the present disclosure.

Referring to FIG. 4 and FIG. 5, FIG. 4 is a schematic structural diagram of the valve driver 4 according to an embodiment of the present disclosure, and FIG. 5 is a schematic structural diagram of the valve driver 4 according to another embodiment of the present disclosure. The valve driver 4 in the present disclosure includes a casing, and logic control module 41, frequency conversion control module 42, and frequency conversion driver module 43 that are installed inside the casing. The frequency conversion driver module 43 is connected to the AC asynchronous motor 3. The logic control module 41 is connected to the frequency conversion driver module 43 through the frequency conversion control module 42. The logic control module 41 is configured to adjust an output torque of the frequency conversion driver module 43 or a limit value of the output torque in real time through the frequency conversion control module 42.

Figure 6:
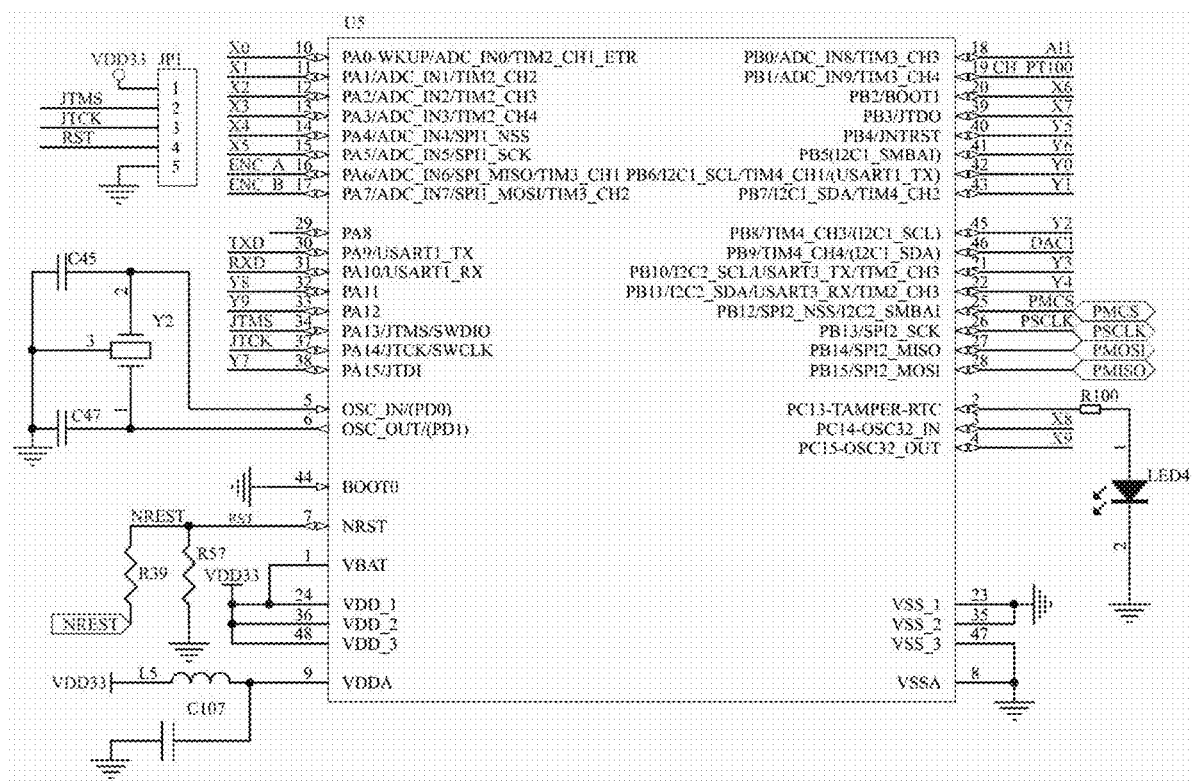
FIG. 6 is schematic diagram of a logic control module according to an embodiment of the present disclosure.

Referring to FIG. 6, FIG. 6 is a schematic diagram of the logic control module according to an embodiment of the present disclosure. The logic control module 41 in this embodiment can be configured to perform overall logic control, and store and execute a control program. The logic control module 41 may be a single-chip microcomputer, a digital signal processor (DSP), a programmable logic controller (PLC), or the like, and may include a program memory, a data memory, a central processing unit (CPU), an IO interface, an internal bus, and the like. The logic control module 41 in this embodiment mainly includes: a torque setting unit configured to set the corresponding set torque based on a requirement of each stage in the opening and closing processes of the valve/door 1; a torque output unit separately connected to the torque setting unit and the frequency conversion control module 42, and configured to send the set torque to the frequency conversion driver module 43, such that the frequency conversion driver module 43 takes the set torque as the output torque or the limit value of the output torque to drive the AC asynchronous motor 3 to perform a corresponding opening or closing action of the valve/door 1; a real-time torque detection unit connected to the transmission device 2 of the AC asynchronous motor 3 or the valve/door 1, and configured to obtain the real-time torque of the AC asynchronous motor 3 or the valve/door 1 during operation; and a torque correction unit separately connected to the torque setting unit, the real-time torque detection unit, and the torque output unit, and configured to correct the output torque based on the real-time torque and the set torque output by torque setting unit, and transmit a corrected output torque to the torque output unit. The torque correction unit takes the set torque as the input and the real-time torque as the feedback based on the real-time torque and the set torque to correct the output torque or the limit value of the output torque by using the PID control algorithm, and transmits the corrected output torque to the torque output unit. The torque output unit transmits the corrected output torque or a corrected limit value of the output torque to the frequency conversion driver module 43 through the frequency conversion control module 42. The frequency conversion driver module 43 drives the AC asynchronous motor 3 to respond in real time.

In order to further improve the control precision, in this embodiment, the control apparatus further includes position sensor 6. The logic control module 41 further includes a speed control unit connected to the position sensor 6 and configured to obtain a current speed of the valve by using an open-loop vector control method or collecting a feedback signal from the position sensor 6, correct an output speed of the AC asynchronous motor 3 by using the PID control algorithm, and superimpose and correct the output torque with the torque correction unit to meet a speed requirement of each stage in opening or closing of the valve/door 1.

In another embodiment of the present disclosure, the logic control module 41 may further include a position control unit connected to the position sensor 6 and configured to determine, based on the feedback signal from the position sensor 6, whether a position node of each stage in the opening or closing process of the valve/door 1 is reached, and further adjust the output torque based on a determining result to meet requirements for control logic and stop position precision of each stage in the opening or closing of the valve/door 1. This embodiment can monitor a position, a speed, and a torque of the valve/door 1 in real time. Based on a nesting relationship, nesting control can be adopted for a torque loop, a speed loop, and a position loop from the inside out. The torque loop directly affects the torque, with a fast response and high precision, which can meet a requirement for real-time control of the output torque of the motor. The speed loop works based on the torque loop, and obtains the current speed of the valve/door 1 from a feedback of the valve driver 4 or the position sensor 6 based on a basic principle of open-loop vector control, and applies an impact through the torque loop to meet speed requirements of different stages. As an optional and supplementary item, the position loop works based on the speed loop and the torque loop, and performs outermost regulation. Based on the feedback from the valve driver 4 or the position sensor 6, the position loop performs determining and regulates an output to meet the requirements for the control logic and the stop position precision.

The position sensor 6 may be a full-stroke sensor and/or a point-type sensor to achieve high-precision position control throughout an entire stroke. The position sensor 6 can be installed on the output shaft of the AC asynchronous motor 3, an output shaft of the reduction transmission case 21 of the valve, or an input or output shaft of the valve driving mechanism 22, and connected to the logic control module or the frequency conversion control module through signal conversion module/IO module 45. The present disclosure is compatible with the full-stroke sensor and the point-type sensor, and is suitable for the full-stroke sensor, the point-type sensor, and a combination of the full-stroke sensor and the point-type sensor. In practice, selection of the position sensor 6 is related to a category, a mechanical structure characteristic, a usage environment, and a production technology level of the valve/door 1, and generally does not change due to a requirement of the valve driver 4. In a system pre-installed with the full-stroke sensor, execution of the valve/door 1 is accurately divided into different stages based on a continuous position signal (the present disclosure may include a start-up stage, an acceleration stage, a constant speed stage, a deceleration stage, a slow-speed approaching stage, a torque control stage, a stop stage, and the like), and a start position, an end position, a speed, a torque, an acceleration, a deceleration, and other parameters of each stage are reasonably controlled to achieve an expected execution effect. The present disclosure, cooperating with different interface conversion hardware, can adapt to various types of full-stroke sensors.

A node point-type sensor still occupies a certain proportion in a valve execution system due to its low cost, convenient installation, and strong environmental adaptability. In a system pre-installed with the node point-type sensor, based on discrete node position signals, different processes of valve execution are finitely identified and obtained through division, and an execution result of the opening or closing is ensured on a premise of ensuring safety. In a system pre-installed with the full-stroke sensor and the point-type sensor, the point-type sensor serves as a protective device or a safety redundancy device for safety protection at an extreme or special position, which is the same as that in the system only pre-installed with the full-stroke sensor. Compatibility of the present disclosure in terms of a sensor type and form expands a use scope and an applicable environment of the present disclosure, and also improves safety of an application process of the present disclosure.

Figure 7:
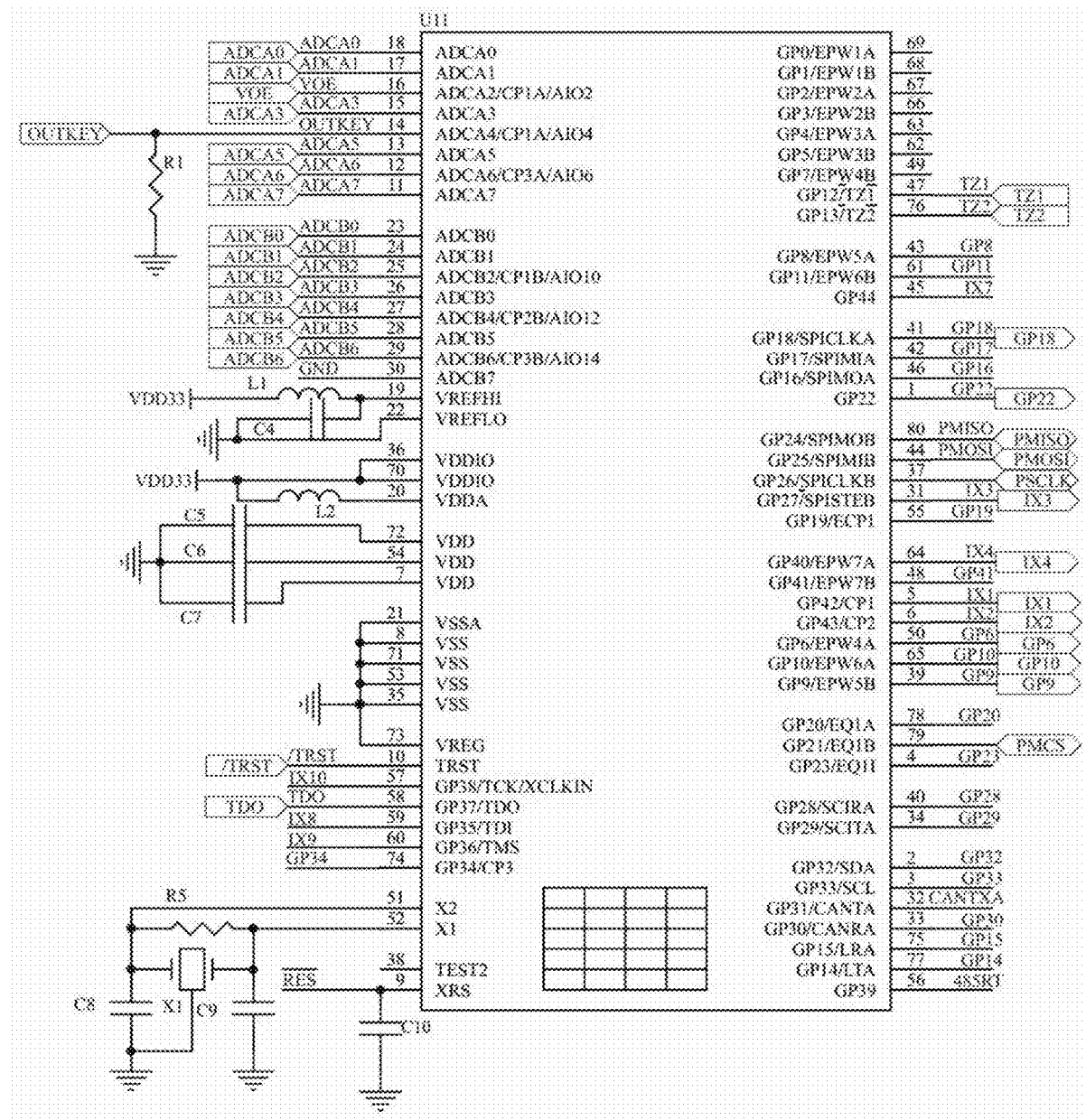
FIG. 7 is a schematic diagram of a frequency conversion control module according to an embodiment of the present disclosure.

Referring to FIG. 7, FIG. 7 is a schematic diagram of a frequency conversion control module according to an embodiment of the present disclosure. The frequency conversion control module 42 in this embodiment may be built by a single-chip microcomputer or DSP chip and a peripheral circuit, and can also be configured to generate a characteristic parameter of the motor and a torque vector control algorithm, and drive the AC asynchronous motor 3 by cooperating with an inverter circuit of the frequency conversion driver module 43. The frequency conversion control module 42 may include a program memory, a data memory, a CPU, an IO interface, an internal bus, and the like.

As shown in FIG. 5, the logic control module 41 and the frequency conversion control module 42 can be integrated into core controller 44. The frequency conversion driver module 43 is separately connected to both the core controller 44 and the AC asynchronous motor 3.

Alternatively, the core controller 44 and the frequency conversion driver module 43 can be integrated into a driver module. The core controller 44 is configured to adjust the output torque of the frequency conversion driver module 43 or the limit value of the output torque in real time to meet a requirement of a control strategy of the valve/door 1. Alternatively, the logic control module 41, the frequency conversion control module 42, and the frequency conversion drive module 43 may also be integrated into a driver module. That is, logic control, frequency conversion control, and output driving functions of the valve driver 4 may be disposed on different modules, or may be integrated on one module. The present disclosure does not limit a structure, a composition, or an integration method of a specific functional module inside the valve driver 4, provided that the output torque of the frequency conversion driver module 43 or the limit value of the output torque can be adjusted in real time to meet the requirement of the control strategy of the valve/door 1.

As a signal judgment and logic control core, the core controller 44 is preferably a single-chip microcomputer or a DSP, and can be specifically equipped with a logic processor, an IO system, an internal bus, and the like. As a basic module of vector frequency conversion control, the frequency conversion driver module 43 can be equipped with a DSP, a power supply conversion circuit, a power driver circuit, and the like. As shown in FIG. 4 and FIG. 5, the valve driver 4 may further include a wireless communication module, detection and protection module 46, an IO module, human-machine interaction module 48, a fieldbus module, a measurement conversion module, temperature control module 47, a power supply battery, a cable connector, and the like. The wireless communication module is configured to connect a remote controller and an external portable device and exchange information, and may include an infrared transceiver circuit, a Bluetooth communication circuit, and infrared communication, Bluetooth communication, serial bus communication, Ethernet communication, and other interfaces to achieve wired or wireless connection between the valve driver 4 and each of torque calibration device 5, an upper computer, a cloud server, and the like. The detection and protection module 46 is configured to perform rectification, filtering, inverse transformation, and other electrical energy conversion when driving the AC asynchronous motor 3, and may include a rectifier circuit, a direct current (DC) circuit, an inverter circuit, a detection circuit, and the like. The IO module is configured to connect, convert, and protect input and output signals, and may include an IO power supply circuit, a digital quantity input circuit, a digital quantity output circuit, an analog quantity input circuit, an analog quantity output circuit, and the like. The human-computer interaction module 48 is configured to enter a parameter and an instruction, and display a running status and alarm information, and may include a display screen, a button panel, and the like. The fieldbus module is configured to exchange information with the upper computer and an external monitoring device, and may include a Modbus, a CAN bus, and the like. The measurement conversion module is configured to convert sinusoidal voltage signals, transistor-transistor logic (TTL) rectangular wave signals, or high threshold logic (HTL) rectangular wave signals that are used by an encoder to collect displacement information of the valve/door into collector open circuit signals and fieldbus signals, and feed back the collector open circuit signals to the logic control module 41, and may include a signal conversion circuit, a high-speed counting circuit, and the like. The temperature control module 47 is configured to perform overall temperature control, and may include a temperature sensor, a cooling fan, an aluminum heat sink, and the like. The valve driver 4 can be configured to control all actions, display information, perform alarming and protection in opening and closing the valve/door 1.

In the embodiment shown in FIG. 5, torque sensor 7 may be further included and is configured to obtain the real-time torque. The real-time torque can be directly obtained through the torque sensor 7. The torque sensor 7 can be installed on the output shaft of the AC asynchronous motor 3, the output shaft of the reduction transmission case 21 of the valve, or the valve driving mechanism 22, and is connected to the real-time torque detection unit to transmit a measured real-time torque signal to the real-time torque detection unit, such that the torque correction unit corrects the output torque or the limit value of the output torque by using the PID control algorithm.

In the embodiment shown in FIG. 4, the logic control module 41 further includes an output current detection unit connected to the real-time torque detection unit, that is, the real-time torque is preferably obtained based on an output current detection result in combination with a vector transformation method. The output current detection unit is configured to detect a physical parameter of the AC asynchronous motor and transmit the physical parameter to the real-time torque detection unit. The real-time torque detection unit calculates the real-time torque and transmits the real-time torque to the torque correction unit. For example, the physical parameter can be detected and obtained through a current detection circuit in the logic control module or the frequency conversion control module. The physical parameter may include resistance of a stator, resistance of a rotor, mutual inductance between the stator and the rotor, leakage inductances of the stator and the rotor, and/or a no-load current.

A three-phase AC signal of the AC asynchronous motor 3 can be converted into torque component $i_{sT}$ of a current of the stator and excitation component $i_{sM}$ of the current of the stator through coordinate conversion. The real-time torque is calculated by using rotor field-oriented vector control, direct torque control, slip frequency vector control, stator field-oriented vector control, or air gap field-oriented vector control based on a field orientation. That is, vector torque control is used as an output method and a detection result of the torque detection circuit (which is preferably an output current detection circuit in this embodiment) is used as the feedback signal to control the output torque through PID closed-loop adjustment to ensure that an actually running output torque that drives the valve/door 1 runs within the set torque, in other words, an expected value range.

In order to achieve vector control more precisely, the present disclosure can also first identify the physical parameter of the AC asynchronous motor 3 through the valve driver 4. Firstly, the resistance of the stator, the resistance of the rotor, the mutual inductance between the stator and the rotor, the leakage inductances of the stator and the rotor, and other parameters of the AC asynchronous motor 3 can be collected to ensure accuracy of basic parameters in torque vector control. That is, the logic control module 41 may further include a physical parameter identification unit configured to obtain the physical parameter of the AC asynchronous motor 3 to perform the torque vector control on the AC asynchronous motor 3 more accurately. AC and DC excitation signals can be inputted into the AC asynchronous motor 3, and a current feedback of the stator can be monitored in real time. The above relevant parameters can be calculated based on values of voltages and currents as well as phase relationships between the voltages and the currents. The no-load current is used to estimate a torque consumption (such as friction, ventilation, and iron core loss) during the running of the AC asynchronous motor 3 and compensate for the output torque of the AC asynchronous motor 3. The no-load current is preferably 20% to 50% of a rated current of the motor.

Figure 8:
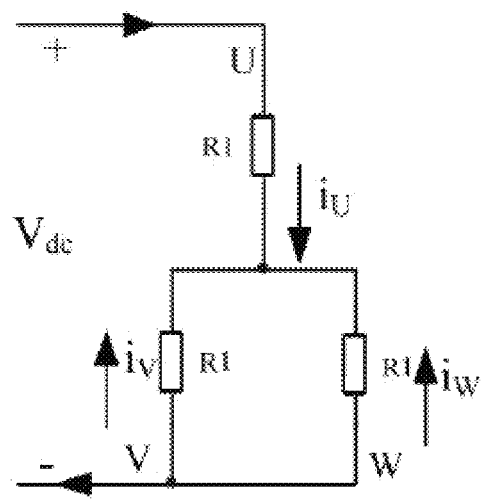
FIG. 8 is an equivalent circuit diagram of resistance identification of a stator according to an embodiment of the present disclosure.

This embodiment uses the output current detection circuit for parameter detection, collects and calculates the real-time torque (which can be obtained based on equivalent self inductance of the rotor, equivalent mutual inductance of the rotor, a magnetic flux of the rotor, a current torque component of the stator, and other values) as a feedback quantity, and performs closed-loop control and correction on the output torque based on a PID control principle to ultimately achieve the torque vector control, thereby ensuring a response speed and control precision of the torque during running of the valve/door 1. The resistance of the stator in this embodiment can be obtained according to a following method:

An inverter power supply is controlled to output a single-phase DC voltage. In this case, a circuit diagram of the motor in this situation can be simplified into one shown in FIG. 8:

$$R_1 = \frac{2}{3} * \frac{V'_{dc}}{i_U} \qquad \#(1-1)$$

In the above formula, $V_{dc}'$=DC voltage, $i_v$=current of the stator, and $R_1$=resistance of the stator.

Due to the impact of the switch transistor voltage drop, the voltage applied to the stator will have a certain amount of error. To eliminate the error, a plurality of different voltage signals can be applied, and a slope between the voltage of the stator and the current of the stator can be taken as the resistance of the stator.

$$R_1 = \frac{2V'_{dc1} - V'_{dc1}}{3i_{U1} - i_{U2}} \qquad \#(1-2)$$

The resistance of the rotor, the mutual inductance between the stator and the rotor, and the leakage inductances of the stator and the rotor in this embodiment can be obtained according to a following method:

An electromagnetic phenomenon of the AC asynchronous motor 3 under excitation by a single-phase sinusoidal signal is basically the same as that under excitation by a three-phase sinusoidal signal, and is identified by using this method. In this case, the torque of the motor is zero and the motor remains stationary. In this case, an equivalent circuit of the motor can be replaced by a three-phase equivalent circuit.

A vector equation for the stator and the rotor of the AC asynchronous motor 3 is as follows:

$$\begin{pmatrix} \dot{u}_s \\ \dot{u}_r \end{pmatrix} = \begin{pmatrix} R_1 + (L_{s\sigma} + L_m)p & L_m P \\ L_m(p - J\omega) & R_r + (L_{r\sigma} + L_m)(p - J\omega) \end{pmatrix} \begin{pmatrix} i_s \\ i_r \end{pmatrix} \qquad \#(1-3)$$

In the above equation, $\dot{u}_s = \{u_U, u_V, u_W\}$, $i_s = \{i_U, i_V, i_W\}$, $i = \{i_u, i_v, i_w\}$, p represents a differential operator, $R_1$ represents the resistance of the stator, $R_r$ represents the resistance of the rotor, $L_{s\sigma}$ represents the leakage inductance of the stator, $L_{r\sigma}$ represents the leakage inductance of the rotor, $L_m$ represents the mutual inductance between the stator and the rotor, ω represents a speed of the rotor, and a cage-type rotor is $\dot{u}_r = 0$.

An output W phase is disconnected. For U and V phases, on/off of an inverter is controlled based on an H-bridge sinusoidal voltage modulation signal, thereby generating a sinusoidal voltage excitation signal. Assuming sinusoidal voltages of the U and V phases are $U_{UV}=V \sin(2\pi ft+\varphi_0)$, a phase voltage and a phase current of the AC asynchronous motor 3 satisfy following relationships:

$$\left\{ V_{Un} = V_{Vn} = \frac{1}{2}V_{UV} = \frac{1}{2}V\sin(2\pi ft + \varphi_0) \right. \qquad \#(1-4)$$

$$\left\{ \begin{array}{l} i_U = -i_V = I\sin(2\pi ft + \varphi_i) \\ i_w = 0 \end{array} \right. \qquad \#(1-5)$$

In the above relationships, $V_{Un}$, $V_{Vn}$, $V_{wn}$ respectively represent the voltages of the U, V, and W phases relative to the neutral-point.

Figure 9:
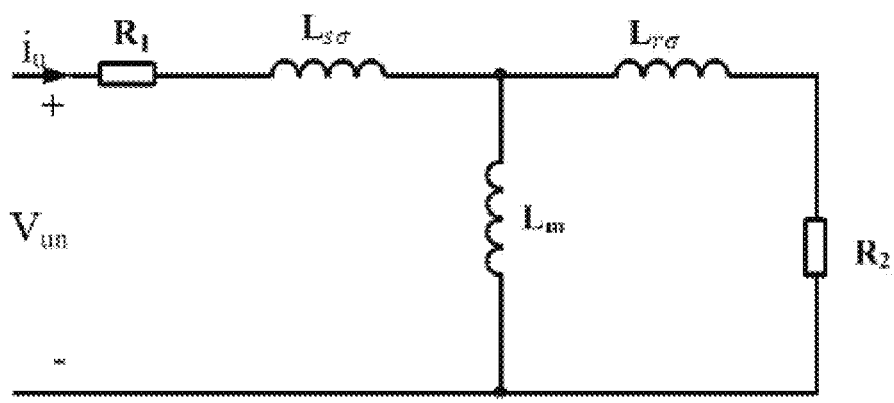
FIG. 9 is a T-shaped equivalent circuit diagram of a motor according to an embodiment of the present disclosure.
Figure 10:
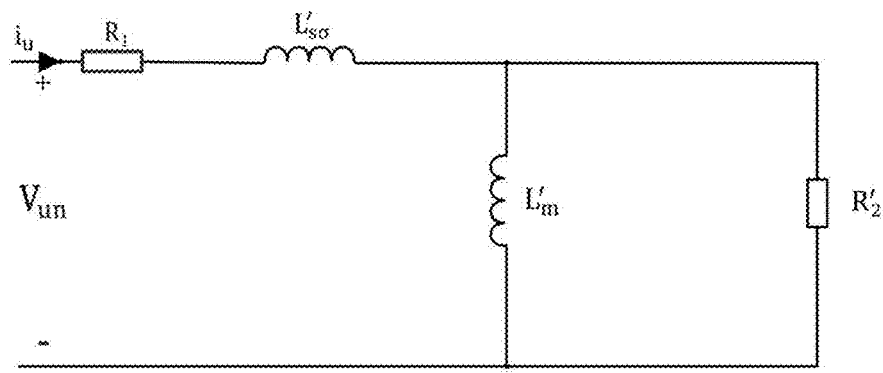
FIG. 10 is an inverse I-shaped equivalent circuit diagram of a motor according to an embodiment of the present disclosure.

In this case, the torque of the motor is 0, and a T-shaped equivalent circuit diagram of the motor is shown in FIG. 9. Generally, the leakage inductance of the stator is the same as the leakage inductance of the rotor, namely $L_{s\sigma}=L_{r\sigma}$. FIG. 10 shows an inverse Γ-shaped equivalent circuit of a motor according to an embodiment of the present disclosure, which is a circuit obtained after an equivalent transformation made to the T-shaped equivalent circuit. After the equivalent transformation, the relationships between the inverse Γ-shaped equivalent circuit and the T-shaped equivalent circuit are as follows:

$$L'_m = \frac{L_m^2}{L_{r\sigma}} \qquad \#(1-6)$$

$$L'_{s\sigma} = L_{s\sigma} + L_m - \frac{L_m^2}{L_{r\sigma}} \qquad \#(1-7)$$

$$R'_2 = \left(\frac{L_m}{L_{r\sigma}}\right)^2 * R_2 \qquad \#(1-8)$$

Based on the figure, it can be obtained that:

$$V_{Un} = \frac{1}{2}Ve^{j(2\pi ft + \varphi_0)} \qquad \#(1-9)$$

$$i_U = Je^{j(2\pi ft + \varphi_i)} \qquad \#(1-10)$$

In the above formulas, $\varphi_0$ represents an initial phase of the voltage, and $\varphi_i$ represents an initial phase of the current.

Based on the formula (1-6) to the formula (1-9), it can be obtained that:

$$Z_u = \frac{V}{2I}e^{j(\varphi_0 - \varphi_i)} = \frac{V}{2I}(\cos(\varphi_0 - \varphi_i) + j\sin(\varphi_0 - \varphi_i)) \qquad \#(1-11)$$

Based on the inverse Γ-shaped equivalent circuit, it can be obtained that an impedance expression is as follows:

$$Z_u = R + jX = \\ R_1 + \frac{R_2'(2\pi f L_m')^2}{(2\pi f L_m')^2 + (R_2')^2} + j\left[2\pi f L_1' + \frac{2\pi f L_m'(R_2')^2}{(2\pi f L_m')^2 + (R_2')^2}\right] \quad \#(1-12)$$

Sinusoidal voltage signals with frequencies of $f_1$ and $f_2$ are applied to the AC asynchronous motor 3 to conduct a single-phase test on the motor to detect equivalent impedance of a current molecule of the stator, and $R'(f)=R-R_1$ is set. According to the formula (1-12), a calculation formula for a motor parameter under the inverse Γ-shaped equivalent circuit can be obtained.

$$R_2' = \frac{R'(f_2) \times R'(f_1) \times (f_1^2 - f_2^2)}{R'(f_2) \times f_1^2 - R'(f_1) \times f_2^2} \quad \#(1-13)$$

$$L_m' = \frac{R_2'}{2\pi f_1} \times \left|\frac{R'(f_1)}{R'(f_1) - R_2'}\right| \quad \#(1-14)$$

$$L_1' = \frac{X(f_1)}{2\pi f_1} - \frac{L_m' R_2'^2}{R_2'^2 + (2\pi f_1 L_m')^2} \quad \#(1-15)$$

According to relationship expression (1-5) of parameter conversion between the T-shaped equivalent circuit and the inverse Γ-shaped equivalent circuit, for the motor, calculation formulas for the resistance of the rotor, the resistance of the stator, the mutual inductance between the stator and the rotor, the leakage inductances of the stator and the rotor can be obtained as follows:

$$R_2 = \frac{L_{s\sigma}' + L_m'}{L_m'} \times R_2' \quad \#(1-16)$$

$$L_m = (L_{s\sigma}' + L_m') \times \sqrt{\frac{R_2'}{R_2}} \quad \#(1-17)$$

$$L_{s\sigma} = L_{r\sigma} + L_{s\sigma}' + L_m' - L_m \quad \#(1-18)$$

In an embodiment of the present disclosure, the rotor field-oriented vector control is preferably used. The field orientation is performed based on a direction of a full magnetic flux vector of the rotor, and the real-time torque $T_{ei}$ is obtained according to a following formula:

$$T_{ei} = \frac{n_p L_{md}}{L_{rd}} i_{sT} \Psi_r.$$

In the above formula, $n_p$ represents a quantity of motor pole pairs of the AC asynchronous motor 3, $L_{md}$ represents equivalent mutual inductance of one phase winding when the stator and the rotor of the AC asynchronous motor 3 are coaxial, $L_{rd}$ represents equivalent self inductance of one phase winding of the rotor of the AC asynchronous motor 3, $i_{sT}$ represents a torque component of the current of the stator of the AC asynchronous motor 3, and $\Psi_r$ represents the magnetic flux of the rotor of the AC asynchronous motor 3.

A control principle is as follows:

$$\begin{cases} \Psi_{rM} = \Psi_r = L_{md} i_{sM} + L_{rd} i_{rM} \\ \Psi_{rT} = 0 = L_{md} i_{sT} + L_{rd} i_{rT} \end{cases} \quad \#(2-1)$$

$$T_{ei} = \frac{n_p L_{md}}{L_{rd}} i_{sT} \Psi_r \quad \#(2-2)$$

$$\Psi_r = \frac{L_{md}}{T_r p + 1} i_{sM} \quad \#(2-3)$$

As described above, $\Psi_{rM}$ represents an M-axis component of the full magnetic flux of the rotor, $\Psi_{rT}$ represents a T-axis component of the full magnetic flux of the rotor, $i_{rM}$ represents an M-axis component of the current of the rotor, $i_{rT}$ represents a T-axis component of the current of the rotor, $n_p$ represents the quantity of motor pole pairs of the motor, $$\frac{3L_m}{2} + L_{r\sigma} L_{rd}$$

represents the equivalent self inductance of the one phase winding or the rotor, $$\frac{3L_m}{2} = L_{md}$$

represents the equivalent mutual inductance of the one phase winding when the stator and the rotor are coaxial, $i_{sT}$ represents the torque component of the current of the stator, $\Psi_r$ represents the magnetic flux of the rotor, $$\frac{L_{rd}}{R_r} = T_r$$

represents an electromagnetic time constant of the rotor, p represents the differential operator, and $i_{sM}$ represents the excitation component of the current of the stator.

In another embodiment of the present disclosure, the direct torque control can also be used, and the real-time torque $T_{ei}$ is obtained according to a following formula:

$$T_{ei} = n_{pL} \frac{L_m}{L_s L_r} \Psi_s \Psi_r \sin \theta_{sr}.$$

In the above formula, $n_p$ represents the quantity of motor pole pairs of the AC asynchronous motor 3, $L_m$ represents the mutual inductance between the stator and the rotor, $L_s$ represents stator inductance, $L_r$ represents rotor inductance, $\Psi_s$ represents a magnetic flux of the stator, $\Psi_r$ represents the magnetic flux of the rotor, and $\theta_{sr}$ represents a torque angle, which is an included angle between the vector $\Psi_s$ and the vector $\Psi_r$.

The direct torque control is based on a mathematical model of a stator shaft system and uses a space vector analysis method to achieve motor control. A control principle is as follows:

A magnetic flux equation of the stator is as follows:

$$\begin{cases} \psi_{s\alpha} = \int (u_{s\alpha} - R_s i_{s\alpha})dt \\ \psi_{s\beta} = \int (u_{s\beta} - R_s i_{s\beta})dt \\ \Psi = \int (u_s - R_s i_s)dt \end{cases} \quad \#(2-17)$$

In the above equation, $u_s$ represents a voltage vector of the stator shaft system.

Voltage drop $R_s i_s$ of the resistance of the stator is ignored, and it can be obtained that:

$$\psi \approx \int u_s dt \# \quad (2\text{-}18)$$

A torque equation is as follows:

$$T_{ei} = n_p \frac{L_m}{L_s L_r} \Psi_s \Psi_r \sin \theta_{sr} \quad \#(2-19)$$

In the above equation, $\theta_{sr}$ represents the torque angle, which is the included angle between the vector $\psi_s$ and the vector $\psi_r$.

In a third embodiment of the present disclosure, the slip frequency vector control can be used. The field orientation is performed based on a slip frequency vector, and the real-time torque $T_{ei}$ is obtained according to a following formula:

$$T_{ei} = \frac{n_p T_r}{L_{rd}} \Psi_r^2 \omega_{s1} \#$$

In the above formula, $n_p$ represents the quantity of motor pole pairs of the AC asynchronous motor 3, $T_r$ represents the electromagnetic time constant of the rotor, $L_{rd}$ represents the equivalent self inductance of the one phase winding of the rotor of the AC asynchronous motor 3, $\psi_r$ represents the magnetic flux of the rotor, and $\omega_{s1}$ represents a slip angle frequency.

The slip frequency vector control can be performed based on the rotor field-oriented vector control, and a control principle is as follows:

$$T_{ei} = \frac{n_p T_r}{L_{rd}} \Psi_r^2 \omega_{s1} \quad \#(2-4)$$

$$\Psi_r = \frac{L_{md}}{T_r p + 1} i_{sM} \quad \#(2-5)$$

As described above, $\omega_{s1}$ represents the slip angle frequency.

In a fourth embodiment of the present disclosure, the stator field-oriented vector control is used. The field orientation is performed based on a direction of a magnetic flux vector of the stator, and the real-time torque $T_{ei}$ is obtained according to a following formula:

$$T_{ei} = n_p \psi_s i_{sT} \#$$

In the above formula, $n_p$ represents the quantity of motor pole pairs of the AC asynchronous motor 3, $\psi_s$ represents the magnetic flux of the stator of the AC asynchronous motor 3, and $i_{sT}$ represents the torque component of the current of the stator of the AC asynchronous motor 3.

In this embodiment, the field orientation is performed based on the direction of the magnetic flux vector of the stator, and a control principle is as follows:

$$\begin{cases} \Psi_{sM} = \Psi_s = L_{sd} i_{sM} + L_{md} i_{rM} \\ \Psi_{sT} = 0 = L_{sd} i_{sT} + L_{md} i_{rT} \end{cases} \quad \#(2-6)$$

$$T_{ei} = n_p \Psi_s i_{sT} \quad \#(2-7)$$

$$\begin{cases} (1 + T_r p)\Psi_s = (1 + \sigma T_r p)L_{sd} i_{sM} - \sigma L_{sd} T_r \omega_{s1} i_{sT} \\ (1 + \sigma T_r p)L_{sd} i_{sT} = T_r \omega_{s1} (\Psi_s - \sigma L_{sd} i_{sM}) \end{cases} \quad \#(2-8)$$

As described above, $\psi_s$ represents the magnetic flux of the stator, $\psi_{sM}$ represents an M-axis component of a full magnetic flux of the stator, $\psi_{sT}$ represents a T-axis component of the full magnetic flux of the stator, and $1 - L_{md}^2 / L_{sd} L_{rd} = \sigma$ represents a magnetic flux leakage coefficient. According to the formula (2-8), it can be known that the magnetic flux $\psi_s$ of the stator is a function of the $i_{sT}$ and $i_{sM}$ between which there is coupling. A decoupling controller needs to be added, and a control principle is as follows:

$$i_{sM}^* = G(\psi_s^* - \psi_s) + i_{MT} \# \quad (2\text{-}9)$$

$$G = K_1 + \frac{K_2}{s} \quad \#(2-10)$$

As described above, $i_{sM}^*$ represents a given excitation component of the current of the stator, $\psi_s^*$ represents a given magnetic flux of the stator, and $i_{MT}$ represents a decoupling control signal. The formula (2-9) is substituted into a first formula of the formula (2-8) to obtain a following formula:

$$(1+T_r p)\psi_s = (1+\sigma T_r p)L_{sd} G(\psi_s^* - \psi_s) + (1+\sigma T_r p)L_{sd} i_{MT} - \sigma L_{sd} T_r \omega_{s1} i_{sT} \# \quad (2\text{-}11)$$

To achieve decoupling control of the $\psi_s$ with the help of the $i_{MT}$, it is set that:

$$(1+\sigma T_r p)L_{sd} i_{MT} - \sigma L_{sd} T_r \omega_{s1} i_{sT} = 0\# \quad (2\text{-}12)$$

Through transformation, it can be obtained that:

$$i_{MT} = \frac{\sigma L_{sd} i_{sT}^2}{T_r (\Psi_s - \sigma L_{sd} i_{sM})} \quad \#(2-13)$$

The formula (2-13) is a decoupler module algorithm that can directly calculate the magnetic flux vector $\psi_s$ of the stator based on a voltage and a current that are detected on a stator side, thereby achieving decoupling.

In a fifth embodiment of the present disclosure, the air gap field-oriented vector control is used. The field orientation is performed based on a direction of a magnetic flux vector of an air gap of the torque, and the real-time torque $T_{ei}$ is obtained according to a following formula:

$$T_{ei} = n_p \psi_m i_{sT} \#$$

In the above formula, $n_p$ represents the quantity of motor pole pairs of the AC asynchronous motor 3, $\psi_m$ represents a magnetic flux of the air gap, and $i_{sT}$ represents the torque component of the current of the stator.

In this embodiment, the field orientation is performed based on the direction of the magnetic flux vector of the air gap, and a control principle is as follows:

$$\begin{cases} \Psi_{mM} = \Psi_m = L_{md}(i_{sM} + i_{rM}) \\ \Psi_{rT} = 0 = L_{md}(i_{sT} + i_{rT}) \end{cases} \quad \#(2-14)$$

$$T_{ei} = n_p \Psi_m i_{sT} \quad \#(2-15)$$

$$p\Psi_m = \frac{\Psi_m}{T_r} + \frac{L_{md}}{L_r}(R_r + T_r)i_{sM} - \omega_{s1} T_r \frac{L_{md}}{L_r i_{sT}} \quad \#(2-16)$$

Figure 11:
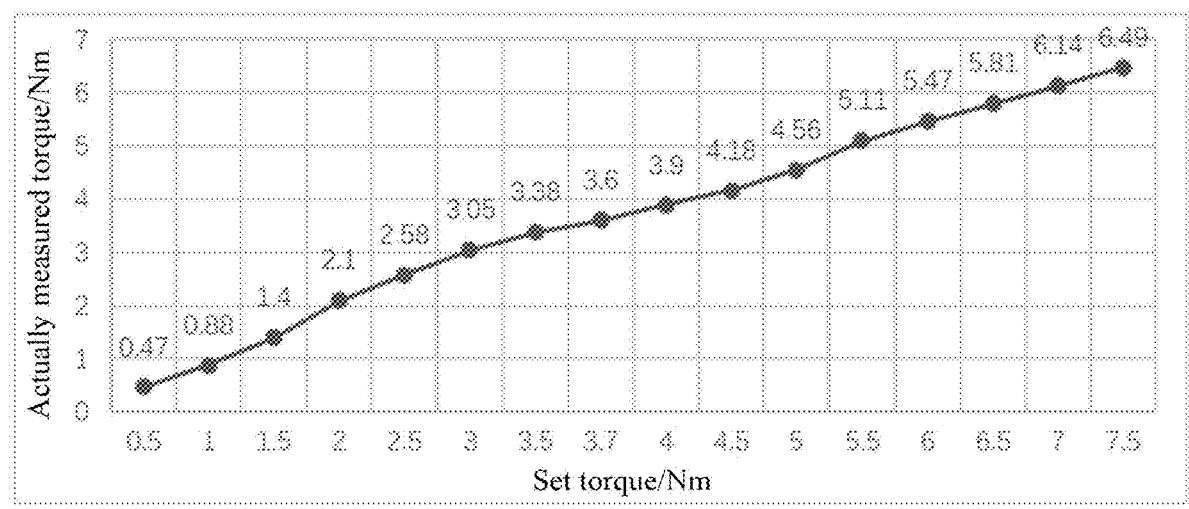
FIG. 11 shows a correspondence between a set torque and an output torque in torque calibration according to an embodiment of the present disclosure.

In the above vector control methods, each physical parameter determining torque control precision changes with long-term running, and the formula for the output torque of the motor theoretically ignores mechanical friction resistance of the system and other factors. Therefore, in an embodiment of the present disclosure, the control apparatus further includes the torque calibration device 5, which is detachably connected to the AC asynchronous motor 3 and connected to the logic control module 41, and configured to perform torque calibration on the AC asynchronous motor 3 to correct the output torque of the valve driver 4. That is, the present disclosure can regularly use on-site torque calibration to eliminate adverse effects of the above factors to achieve long-term stability of the torque control precision of the system. In use, the AC asynchronous motor 3 can be connected to the valve driver 4. After basic system parameters are set and parameter identification is performed, within a range of 10% to 200% of a rated torque of the AC asynchronous motor, at least 10 evenly distributed torque values can be selected as detection points. The valve driver 4 changes the set torque of the AC asynchronous motor 3 point by point according to calibration logic and drives the AC asynchronous motor 3 to load. Then the torque calibration device 5 is installed and fixed on the output shaft of the AC asynchronous motor 3, and connected to the valve driver 4 through a wired signal cable or the wireless communication module. The torque calibration device 5 is used to detect and record an output torque corresponding to the set torque at each point of the AC asynchronous motor 3. A loading process for each detection point is performed for no less than 3 times and an arithmetic average value is taken as an output torque detection result of this detection point. The valve driver 4 takes statistics on and analyzes the above detection data, obtains a deviation between the set torque and the corresponding output torque, and generates a complete set of statistical data. Based on the statistical data, a chart showing a corresponding relationship between the set torque and the corresponding output torque at each level is generated and displayed or output (a display result may be a chart and a curve, as well as necessary prompt information for confirmation), to correct the output torque of the AC asynchronous motor 3. After being confirmed, the corresponding chart can be corrected by the valve driver 4 to obtain a more accurate output torque in the torque control stage. This embodiment provides description only by using an example of comparing the set torque and the corresponding output torque, which can be specifically described in a table below. The table below takes the AC asynchronous motor 3 with a rated power of 0.55 KW, a rated rotational speed of 1450 rpm, and a rated torque of 3.6 Nm as an example to show a relationship between the output torque (namely, a stall torque at the corresponding detection point) and the set torque. Controlling and correcting a low-speed torque and stall torque of the AC asynchronous motor 3 can achieve an accurate sealing pressure in the closing process of the valve/door 1. An error of the stall torque of the AC asynchronous motor 3 is preferably controlled within a range of ±10% (preferably ±4%) of the rated torque to stably and effectively control the sealing pressure of closing the valve/door 1. In addition, discrete detection point data in a statistical table can also be integrated into a segmented function (as shown in FIG. 11, which is broken line segments that are relatively continuous and end-to-end connected, and have different slopes) that describes the relationship between the set torque and the corresponding output torque, for query and use in a torque control process.

TABLE 1

Comparison between the set torque and the corresponding output torque

| No. | Set torque/Nm | Output torque/Nm | Error % |
|---|---|---|---|
| 1 | 0.50 | 0.47 | 0.83 |
| 2 | 1.00 | 0.88 | 3.31 |
| 3 | 1.50 | 1.40 | 2.76 |
| 4 | 2.00 | 2.10 | 2.76 |
| 5 | 2.50 | 2.58 | 2.21 |
| 6 | 3.00 | 3.05 | 1.38 |
| 7 | 3.50 | 3.38 | 3.31 |
| 8 | 3.70 | 3.60 | 2.76 |
| 9 | 4.00 | 3.90 | 2.76 |
| 10 | 4.50 | 4.18 | 8.84 |
| 11 | 5.00 | 4.56 | 12.15 |
| 12 | 5.50 | 5.11 | 10.77 |
| 13 | 6.00 | 5.47 | 14.64 |
| 14 | 6.50 | 5.81 | 19.06 |
| 15 | 7.00 | 6.14 | 23.76 |
| 16 | 7.50 | 6.49 | 27.90 |

The above data describes the relationship between the set torque and the output torque of the AC asynchronous motor 3 based on feature points that are sufficiently dense and uniformly distributed. In this embodiment, when the set torque is within a rated torque range (which is also a torque range required in the torque control stage), the error between the set torque and the output torque is within ±10% (preferably ±4%) of the rated torque, showing a good linear relationship. When the set torque exceeds the rated torque, the error increases. The relationship between the set torque and the output torque can be represented using a piecewise linear equation and is used to correct the output torque. As the test result in the corresponding table is discrete data, in actual use, data between test points is inserted and supplemented using a line segment equation between two adjacent points. For example, when the set torque ranges from 0.5 Nm to 1.0 Nm, based on a start point (0.5, 0.47) and an end point (1.0, 0.88) of a leftmost line segment in FIG. 11, a relationship curve equation between the set torque and the actually measured torque can be obtained as follows:

$$y = 0.82x + 0.06.$$

In the above equation, x represents the set torque, where $0.5 \leq x \leq 1.0$; and y represents an actually measured torque.

Therefore, a piecewise equation can be used to enable the set torque to correspond to the output torque, achieving precise torque control by correcting an output value.

The present disclosure further provides a control method of an electric valve/door. The control method adopts the above control apparatus to ensure that a valve/door "can be opened", "can be closed tightly", and "can be stopped accurately" in an execution process. A core is a complete set of control device and method of a microprocessor software program to drive an AC asynchronous motor by using a vector frequency conversion technology, to drag the valve/door. Information of a real-time torque of the AC asynchronous motor 3 or the valve/door 1 during operation is collected, and a set torque of valve driver 4 is taken as an input and the real-time torque is taken as a feedback to immediately correct an output torque of the valve driver 4 or a limit value of the output torque by using a PID control algorithm, so as to adjust in real time an output torque that drives the AC asynchronous motor 3, to meet requirements for a response speed and control precision of each stage in opening and closing processes of the valve/door 1. According to the control method, a logic control module can be configured to set the corresponding set torque based on a requirement of each stage in the opening and closing processes of the valve/door 1. A frequency conversion control module is configured to control a frequency conversion driver module to drive the AC asynchronous motor 3 to perform a corresponding opening or closing action of the valve/door 1 by taking the set torque as the output torque or the limit value of the output torque. A real-time torque detection unit is configured to detect the real-time torque of the AC asynchronous motor 3 or the valve/door 1 during operation. A torque correction unit is configured to take the set torque as the input and the real-time torque as the feedback based on the real-time torque and the set torque, and correct the output torque by using the PID control algorithm, to adjust a response speed and control precision of the output torque in real time based on the real-time torque. The steps of detecting the real-time torque and correcting the torque are repeated in the opening or closing process of the valve/door 1 until the valve/door 1 is opened or closed in place, to achieve torque closed-loop control in the opening or closing process of the valve/door 1.

The present disclosure can be applicable to opening and closing control of various valves/doors 1, and meet control requirements of a sliding door, a side-hung door, a revolution door, a blind door, a gate valve, a stop valve, a ball valve, a butterfly valve, a plug valve, an air valve, and the like under different working conditions. A Control Valve achieves different flow characteristics by precisely adjusting the opening size of the valve/door 1 or the movement speed in the opening/closing process of the valve/door 1. There are different flow characteristics such as an equal percentage control characteristic, a direct control characteristic, a fast opening control characteristic, and a parabolic control characteristic. Each adjustment of any intermediate position of the Control Valve can be regarded as a complete movement process. For example, a process of changing an opening/closing angle of the ball valve from 45° to 60° during traffic adjustment includes following working processes: a start-up stage, an acceleration stage, a constant speed stage, a deceleration stage, an approaching stage, and a stop stage. The On-Off Valve needs to be opened or closed at a certain speed, and needs to ensure sealing when being closed. Therefore, compared with the Control Valve, opening or closing the valve further includes a torque control process. For example, a closing process of the gate valve can be divided into the start-up stage, the acceleration stage, the constant speed stage, the deceleration stage, a slow-speed approaching stage, a torque control stage, and the stop stage.

By performing torque vector control, on-site torque calibration, and motor parameter identification on the AC asynchronous motor 3, the present disclosure can dynamically control the output torque and statically correct the set torque. A torque loop, a speed loop, and a position loop are established from the inside out by using a multi-PID nesting method, and a closed-loop level or a nesting depth is selected based on requirements of different stages in an execution process of the valve/door 1. This achieves full-stroke quasi-servo control of position, speed, and torque three-closed-loop control of an ordinary AC asynchronous motor 3, ensuring a rapid and accurate execution process of the valve/door 1, as well as an accurate and effective execution result. That is, a method of using externally nested closed speed and position loops to perform nesting control on the closed torque loop (such as a closed current loop) performs speed and position control in an execution stage in which a response speed and positioning precision need to be ensured, while improving the response speed and the control precision of the output torque. This further improves efficiency, stability, accuracy, and flexibility of the execution process. Sealing pressure of closing the valve can be precisely controlled, and power of the ordinary AC asynchronous motor 3 can be precisely controlled by optimizing a matching parameter of the speed and the torque based on a full-stroke load change of the On-Off Valve, such that the valve/gate "can be closed tightly", "can be stopped accurately", and "can be opened". In addition, based on the start-up stage, the acceleration stage, the constant speed stage, the deceleration stage, the slow-speed approaching stage, the torque control stage, and the stop stage during movement of the valve/door, staged combination control can be achieved to meet requirements for fast opening and closing of the valve/door, water hammer arresting, working condition control of the valve, and fault response. By means of short-term "overfrequency" (overspeed) operation and "overcurrent" (overtorque) operation, a smaller-rated AC asynchronous motor 3 can be used, thereby reducing a product volume and weight, lowering a cost, and improving a dynamic characteristic of a pipeline system. In this way, load smoothness control is driven by the ordinary AC asynchronous motor 3, and current impact on a power grid can be also reduced.

Certainly, the present disclosure may further include other various embodiments. A person skilled in the art can make various corresponding modifications and variations according to the present disclosure without departing from the spirit and essence of the present disclosure, but all these corresponding modifications and variations shall fall within the protection scope defined by the appended claims in the present disclosure.

What is claimed is:

1. A control apparatus of an electric valve/door, comprising an alternating current (AC) asynchronous motor, a transmission device, and a valve driver, wherein the valve driver is connected to the AC asynchronous motor; the AC asynchronous motor is connected to a valve/door through the transmission device; the valve driver is configured to collect information of a real-time torque of the AC asynchronous motor or the valve/door during operation, and take a set torque of the valve driver as an input and the real-time torque as a feedback to immediately correct an output torque of the valve driver or a limit value of the output torque by using a proportional-integral-derivative (PID) control algorithm, so as to adjust in real time an output torque that drives the AC asynchronous motor, to meet requirements for a response speed and control precision of each stage in opening and closing processes of the valve/door.

2. The control apparatus of the electric valve/door according to claim 1, wherein the valve driver comprises a casing, and a logic control module, a frequency conversion control module, and a frequency conversion driver module that are installed inside the casing, wherein the frequency conversion driver module is connected to the AC asynchronous motor, the logic control module is connected to the frequency conversion driver module through the frequency conversion control module, the logic control module is configured to adjust an output torque of the frequency conversion driver module or a limit value of the output torque in real time through the frequency conversion control module, and the logic control module comprises:
- a torque setting unit configured to set the corresponding set torque according to a requirement of each stage in the opening and closing processes of the valve/door;
- a torque output unit configured to send the set torque to the frequency conversion driver module, such that the frequency conversion driver module takes the set torque as the output torque or the limit value of the output torque to drive the AC asynchronous motor to perform a corresponding opening or closing action of the valve/door;
- a real-time torque detection unit configured to obtain the real-time torque of the AC asynchronous motor or the valve/door during operation; and
- a torque correction unit configured to correct the output torque or the limit value of the output torque by using the PID control algorithm based on the real-time torque and the set torque, and transmit a corrected output torque or a corrected limit value of the output torque to the torque output unit, such that the torque output unit transmits the corrected output torque to the frequency conversion driver module through the frequency conversion control module, and the frequency conversion driver module drives the AC asynchronous motor to respond in real time.

3. The control apparatus of the electric valve/door according to claim 2, wherein the logic control module further comprises an output current detection unit connected to the real-time torque detection unit, and the output current detection unit is configured to detect a physical parameter of the AC asynchronous motor and transmit the physical parameter to the real-time torque detection unit, such that the real-time torque detection unit calculates the real-time torque and transmits the real-time torque to the torque correction unit, wherein the physical parameter comprises resistance of a stator, resistance of a rotor, mutual inductance between the stator and the rotor, leakage inductances of the stator and the rotor, and/or a no-load current.

4. The control apparatus of the electric valve/door according to claim 3, further comprising a position sensor, wherein the logic control module further comprises a speed control unit connected to the position sensor and configured to collect a feedback signal from the position sensor to obtain a current speed of the valve, correct an output speed of the AC asynchronous motor by using the PID control algorithm, and superimpose and correct the output torque to meet a speed requirement of each stage in opening or closing of the valve/door.

5. The control apparatus of the electric valve/door according to claim 3, further comprising a torque calibration device detachably connected to the AC asynchronous motor and connected to the logic control module, and configured to perform torque calibration on the AC asynchronous motor to correct the output torque of the valve driver.

6. The control apparatus of the electric valve/door according to claim 2, further comprising a torque sensor configured to obtain the real-time torque, wherein the torque sensor is installed on an output shaft of the AC asynchronous motor, an output shaft of a reduction transmission case of the valve, or a valve driving mechanism, and is connected to the real-time torque detection unit or the frequency conversion control module to transmit a measured real-time torque signal to the real-time torque detection unit or the frequency conversion control module.

7. The control apparatus of the electric valve/door according to claim 6, further comprising a position sensor, wherein the logic control module further comprises a speed control unit connected to the position sensor and configured to collect a feedback signal from the position sensor to obtain a current speed of the valve, correct an output speed of the AC asynchronous motor by using the PID control algorithm, and superimpose and correct the output torque to meet a speed requirement of each stage in opening or closing of the valve/door.

8. The control apparatus of the electric valve/door according to claim 6, further comprising a torque calibration device detachably connected to the AC asynchronous motor and connected to the logic control module, and configured to perform torque calibration on the AC asynchronous motor to correct the output torque of the valve driver.

9. The control apparatus of the electric valve/door according to claim 2, further comprising a position sensor, wherein the logic control module further comprises a speed control unit connected to the position sensor and configured to collect a feedback signal from the position sensor to obtain a current speed of the valve, correct an output speed of the AC asynchronous motor by using the PID control algorithm, and superimpose and correct the output torque to meet a speed requirement of each stage in opening or closing of the valve/door.

10. The control apparatus of the electric valve/door according to claim 2, further comprising a torque calibration device detachably connected to the AC asynchronous motor and connected to the logic control module, and configured to perform torque calibration on the AC asynchronous motor to correct the output torque of the valve driver.

11. The control apparatus of the electric valve/door according to claim 1, further comprising a position sensor, wherein a logic control module further comprises a speed control unit connected to the position sensor and configured to collect a feedback signal from the position sensor to obtain a current speed of the valve, correct an output speed of the AC asynchronous motor by using the PID control algorithm, and superimpose and correct the output torque to meet a speed requirement of each stage in opening or closing of the valve/door.

12. The control apparatus of the electric valve/door according to claim 11, wherein the logic control module further comprises a position control unit connected to the position sensor and configured to determine, based on the feedback signal from the position sensor, whether a position node of each stage in the opening or closing process of the valve/door is reached, and further adjust the output torque based on a determining result to meet requirements for control logic and stop position precision of each stage in the opening or closing of the valve/door.

13. The control apparatus of the electric valve/door according to claim 12, further comprising a torque calibration device detachably connected to the AC asynchronous motor and connected to the logic control module, and configured to perform torque calibration on the AC asynchronous motor to correct the output torque of the valve driver.

14. The control apparatus of the electric valve/door according to claim 11, wherein the position sensor is a full-stroke sensor and/or a point-type sensor, and the position sensor is installed on the output shaft of the AC asynchronous motor, an output shaft of a reduction transmission case of the transmission device, or a valve driving mechanism.

15. The control apparatus of the electric valve/door according to claim 14, further comprising a torque calibration device detachably connected to the AC asynchronous motor and connected to the logic control module, and configured to perform torque calibration on the AC asynchronous motor to correct the output torque of the valve driver.

16. The control apparatus of the electric valve/door according to claim 1, further comprising a torque calibration device detachably connected to the AC asynchronous motor and connected to a logic control module, and configured to perform torque calibration on the AC asynchronous motor to correct the output torque of the valve driver.

17. A control method of an electric valve/door, comprising: using the control apparatus of the electric valve/door according to claim 1 to collect the information of the real-time torque of the AC asynchronous motor or the valve/door during operation, and take the set torque of the valve driver as the input and the real-time torque as the feedback to immediately correct the output torque of the valve driver or the limit value of the output torque by using the PID control algorithm, so as to adjust in real time the output torque that drives the AC asynchronous motor, to meet the requirements for the response speed and control precision of each stage in the opening and closing processes of the valve/door.

18. The control method of the electric valve/door according to claim 17, wherein in the control apparatus, the valve driver comprises a casing, and a logic control module, a frequency conversion control module, and a frequency conversion driver module that are installed inside the casing, wherein the frequency conversion driver module is connected to the AC asynchronous motor, the logic control module is connected to the frequency conversion driver module through the frequency conversion control module, the logic control module is configured to adjust an output torque of the frequency conversion driver module or a limit value of the output torque in real time through the frequency conversion control module, and the logic control module comprises:

a torque setting unit configured to set the corresponding set torque according to a requirement of each stage in the opening and closing processes of the valve/door;

a torque output unit configured to send the set torque to the frequency conversion driver module, such that the frequency conversion driver module takes the set torque as the output torque or the limit value of the output torque to drive the AC asynchronous motor to perform a corresponding opening or closing action of the valve/door;

a real-time torque detection unit configured to obtain the real-time torque of the AC asynchronous motor or the valve/door during operation; and a torque correction unit configured to correct the output torque or the limit value of the output torque by using the PID control algorithm based on the real-time torque and the set torque, and transmit a corrected output torque or a corrected limit value of the output torque to the torque output unit, such that the torque output unit transmits the corrected output torque to the frequency conversion driver module through the frequency conversion control module, and the frequency conversion driver module drives the AC asynchronous motor to respond in real time.

19. The control method of the electric valve/door according to claim 18, wherein in the control apparatus, the logic control module further comprises an output current detection unit connected to the real-time torque detection unit, and the output current detection unit is configured to detect a physical parameter of the AC asynchronous motor and transmit the physical parameter to the real-time torque detection unit, such that the real-time torque detection unit calculates the real-time torque and transmits the real-time torque to the torque correction unit, wherein the physical parameter comprises resistance of a stator, resistance of a rotor, mutual inductance between the stator and the rotor, leakage inductances of the stator and the rotor, and/or a no-load current.

20. An electric valve/door, comprising the control apparatus of the electric valve/door according to claim 1.

* * * * *